(12) United States Patent
Ishihara et al.

(10) Patent No.: US 7,793,361 B2
(45) Date of Patent: Sep. 14, 2010

(54) ARTICLE OF APPAREL INCORPORATING A SEPARABLE ELECTRONIC DEVICE

(75) Inventors: James Alec Ishihara, Beaverton, OR (US); Scott Wilson, Portland, OR (US); Stephen Dylan Berry, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 736 days.

(21) Appl. No.: 10/987,577

(22) Filed: Nov. 12, 2004

(65) Prior Publication Data

US 2006/0117458 A1  Jun. 8, 2006

(51) Int. Cl.
*A41D 20/00* (2006.01)
(52) U.S. Cl. .......................................................... 2/170
(58) Field of Classification Search .................. 2/115, 2/160, 170, 244, 905; 224/164, 178; 368/278, 368/281–283
See application file for complete search history.

(56) References Cited

U.S. PATENT DOCUMENTS

| | | | | |
|---|---|---|---|---|
| 1,416,653 | A | * | 5/1922 | Lenneberg ...................... 2/160 |
| 2,103,711 | A | * | 12/1937 | Cole .............................. 2/160 |
| 3,492,809 | A | * | 2/1970 | Gisiger-Lusa ................ 368/282 |
| 3,672,157 | A | * | 6/1972 | Manceri ...................... 368/282 |
| 4,034,552 | A | * | 7/1977 | Davidson .................... 368/280 |
| 4,281,389 | A | * | 7/1981 | Smith ......................... 702/178 |
| 4,462,116 | A | * | 7/1984 | Sanzone et al. ................ 2/170 |
| D281,674 | S | * | 12/1985 | Novak ........................ D10/31 |
| 4,645,102 | A | * | 2/1987 | Proellochs .................. 224/178 |
| 4,761,835 | A | * | 8/1988 | Chen ............................. 2/160 |
| 4,766,611 | A | * | 8/1988 | Kim .............................. 2/160 |
| 4,769,799 | A | * | 9/1988 | Matsukage .................. 368/278 |
| 4,862,521 | A | * | 9/1989 | Mann ............................ 2/160 |
| 4,918,759 | A | * | 4/1990 | Anderson et al. ............. 2/209.7 |
| D355,132 | S | * | 2/1995 | Williams ..................... D10/32 |
| 5,610,877 | A | * | 3/1997 | Adams et al. ................ 368/10 |
| 5,617,751 | A | * | 4/1997 | Song ......................... 70/456 R |
| 5,623,731 | A | * | 4/1997 | Ehrgott et al. ................. 2/160 |
| 5,812,500 | A | * | 9/1998 | Webb, Jr. .................... 368/282 |
| 5,825,327 | A | * | 10/1998 | Krasner ................... 342/357.09 |

(Continued)

FOREIGN PATENT DOCUMENTS

CH  536 083  4/1973

(Continued)

OTHER PUBLICATIONS

International Search Report in corresponding PCT application; International Application No. PCT/US2005/036666. ISR mailed Feb. 23, 2006.

(Continued)

*Primary Examiner*—Gary L Welch
*Assistant Examiner*—Amber R Anderson
(74) *Attorney, Agent, or Firm*—Banner & Witcoff, Ltd.

(57) ABSTRACT

An article of apparel is disclosed that includes an electronic device. The apparel is at least partially formed from a material element that defines an aperture. The electronic device is locatable within the aperture and removably-securable to the material element. The electronic device may be a timing device, such as a watch, or a global positioning system unit. The apparel may be a wristband formed from a textile material or any of a variety of other types of apparel.

38 Claims, 7 Drawing Sheets

U.S. PATENT DOCUMENTS

| | | | | |
|---|---|---|---|---|
| 5,838,642 | A * | 11/1998 | Tully | 368/282 |
| 5,912,653 | A * | 6/1999 | Fitch | 345/87 |
| 5,924,135 | A * | 7/1999 | Worth | 2/125 |
| 6,209,144 | B1 * | 4/2001 | Carter | 2/458 |
| 6,213,634 | B1 * | 4/2001 | Harrington et al. | 368/283 |
| 6,275,996 | B1 * | 8/2001 | Redwood et al. | 2/160 |
| 6,295,703 | B1 * | 10/2001 | Adams et al. | 24/459 |
| 6,366,250 | B1 * | 4/2002 | McConnell | 343/718 |
| 6,611,962 | B2 * | 9/2003 | Redwood et al. | 2/160 |
| 6,685,634 | B1 * | 2/2004 | Fry | 600/300 |
| 6,708,136 | B1 * | 3/2004 | Lahiff | 702/177 |
| 6,728,971 | B1 * | 5/2004 | Benavidez | 2/161.4 |
| D503,895 | S * | 4/2005 | Black | D10/32 |
| D514,975 | S * | 2/2006 | Blackmore | D10/131 |
| 7,023,320 | B2 * | 4/2006 | Dvorak | 340/5.53 |
| 7,124,447 | B2 * | 10/2006 | Arganese | 2/160 |
| 2003/0213045 | A1 * | 11/2003 | Fuentes | 2/69 |
| 2004/0190383 | A1 * | 9/2004 | Marcucelli et al. | 368/278 |

FOREIGN PATENT DOCUMENTS

| | | |
|---|---|---|
| CH | 685 586 | 8/1995 |
| DE | 296 16 787 | 3/1997 |
| DE | 29616787 U1 * | 3/1997 |
| FR | 2612051 A1 * | 9/1988 |
| SE | 9904243 A * | 5/2001 |

OTHER PUBLICATIONS

Five, (5), photographs of a timepiece that was commerically available from Claire's Boutique in 2004.

Office Action issued Dec. 4, 2009 in corresponding Chinese Patent Application No. 2005800460682, and English translation thereof.

Office Action issued Jul. 10, 2009 in corresponding Chinese Application No. 2005-80046068.2 and English translation thereof.

Office Action issued Aug. 26, 2009 in corresponding European Patent Application No. 05807682.9.

* cited by examiner

ARTICLE OF APPAREL INCORPORATING A SEPARABLE ELECTRONIC DEVICE

BACKGROUND OF THE INVENTION

1. Field of the Invention

The present invention relates to apparel. The invention concerns, more particularly, an article of apparel that incorporates an electronic device that is removable or otherwise separable from a remainder of the apparel.

2. Description of Background Art

Athletes utilize a variety of electronic devices to assist with training exercises or competitions. For example, an athlete may make use of a timing device to track and display time, record split or lap times, provide chronographic data, or function as an alarm. Global positioning systems may also be utilized to calculate distances and, in combination with a watch or other timing device, calculate an average velocity. In addition, the electronic devices may function to gauge the temperature of surrounding air, determine altitude or direction, monitor heart rate, facilitate communication between two or more individuals, provide audible signals to pace the velocity of the wearer, or display the date. Accordingly, a variety of electronic devices may be utilized during training exercises or competitions to assist the athlete or impart an advantage to the athlete.

Each of the electronic devices discussed above may be incorporated into a wrist-mounted unit. As an example, a timing device (i.e., a watch) may include an electronic timing element, a case, and a band. The electronic timing element is located within the case and functions to track the time and display the time for a wearer or another individual. The case functions to protect the electronic timing element and often includes a transparent face for viewing a time display on the electronic timing element. The band extends from opposite sides of the case and secures the case and electronic timing element to a wrist of the wearer.

Although a majority of watches include the electronic timing element, case, and band, modern watch designs include a plurality of variations upon these components. The electronic timing element, for example, may be replaced by a mechanical movement or an element with a combination of mechanical and electrical features. The band may incorporate a clasp that secures the watch to the wrist, or the band may exhibit an open, bracelet-like configuration. Furthermore, the materials that form the various components may include both polymers and metals, for example. Differences in the various elements forming watches may be utilized, for example, to provide enhanced utility to the wearer, decrease the mass of the watch, or enhance the aesthetic appeal of the watch.

SUMMARY OF THE INVENTION

The present invention is an article of apparel, such as a wristband or jacket, that includes an electronic device. The apparel is at least partially formed from a material element that defines an aperture. The electronic device is locatable within the aperture and removably-securable to the material element. The electronic device may be a timing device, such as a watch, or a global positioning system unit.

The electronic device may include a case, circuitry, and a pair of securing elements. The circuitry is positioned within the case, and the securing elements extend around the case. The securing elements are separated to define a peripheral indentation extending at least partially around an exterior of the electronic device. The electronic device is positionable within the aperture and may be secured to the material element by locating an edge of the material element within the peripheral indentation. The electronic device may be separated from the wristband by disconnecting the edge and the peripheral indentation.

Another aspect of the invention involves a method of assembling an article of apparel. The method includes providing an aperture in a wristband and locating an electronic element within the aperture. In addition, the method includes positioning securing elements around the electronic element and on opposite sides of the material element to secure the electronic element to the material element. The electronic element may be removed from the aperture. When removed, the wristband may be subjected to a washing process in the absence of the electronic element. Also, the electronic element may be interchanged with another electronic element.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose various articles of apparel that incorporate an electronic device. In general, the articles of apparel are formed from a material element, such as a textile or polymer sheet, that defines an aperture. The electronic device may be positioned within the aperture and secured to the material element. In addition, the electronic device may be detached from the material element and removed from the aperture. That is, the electronic device may be separated from a remainder of the article of apparel. This configuration permits the remainder of the article of apparel, including the material element, to go through a washing process in the absence of the electronic device, thereby decreasing the probability of damaging the electronic device during the washing process. This configuration also permits the electronic device to be interchanged with one of a plurality of other electronic devices that perform a different function.

An article of apparel 10 is depicted in FIGS. 1-6 as including a wristband 20 and an electronic device 30. In general, apparel 10 forms a dual-purpose device that may assist athletes with training exercises or competitions. For example, wristband 20 may be utilized to absorb and remove perspiration or other moisture from areas proximal the face of the athlete, and electronic device 30 may be utilized to track and display time, record split or lap times, provide chronographic data, or facilitate communication between two or more individuals (i.e., as a wireless phone or two-way communication device). Following the training exercises or competitions, electronic device 30 may be separated from wristband 20 in order to permit wristband 20 go through a washing process in the absence of electronic device 30. Alternately, for example, electronic device 30 may be interchangeable with another electronic device.

Wristband 20 is at least partially formed from a textile material, for example, and exhibits the general configuration of a conventional wristband. Accordingly, the textile material forming wristband 20 forms a looped or generally cylindrical structure having interior dimensions that approximate dimensions of a wrist. Although a variety of textile materials are suitable for wristband 20, exemplar textile materials include either a single-sided terry knit textile or a double-sided terry knit textile. Yarns forming the terry knit textile may be formed from fibers and filaments that include natural, synthetic, or combinations of natural and synthetic materials. More particularly, the various terry loops that characterize the terry knit textile may be formed from cotton yarns to promote moisture-absorption and comfort. Other portions of the textile material forming wristband 20 may incorporate an elastic fiber that enhances the stretch and recovery properties of wristband 20, thereby permitting the circumference of wristband 20 to expand and contract in order to assist with placing apparel 10 upon the wrist and accommodate wrists of different size. A suitable elastic fiber is formed from elastane, which is available from E.I. duPont de Nemours Company under the LYCRA trademark. Other material elements, in addition to the textile materials discussed above, may be utilized for wristband 20.

Wristband 20 may be formed from one or more elements of textile materials that form the looped or generally cylindrical structure. As depicted in FIGS. 1-4, wristband 20 may be formed from a tubular structure of textile material that is folded inward to form a seam 21 circumscribing an interior surface of wristband 20. Alternately, wrist band 20 may have a non-folded configuration, or wristband 20 may be formed from a planar element of textile material with joined ends that form a seam extending perpendicular to seam 21. Based upon the above discussion, therefore, wristband 20 may be formed in a variety of ways and may exhibit a variety of configurations within the scope of the present invention.

In contrast with the conventional wristband, wristband 20 defines an aperture 22 that extends through wristband 20. A reinforcing structure 23 formed from a semi-rigid material extends around aperture 22 and has a generally rectangular configuration that corresponds with exterior dimensions of electronic element 30. In addition to retaining a shape of aperture 22, reinforcing structure 23 limits fraying or unraveling of the textile material in areas of wristband 20 that are adjacent to aperture 22. Reinforcing structure 22 may be formed from a variety of materials, including polymers and metals. Accordingly, suitable polymers for reinforcing structure 23 include nylon and polyurethane, and suitable metals for reinforcing structure 23 include steel, stainless steel, aluminum, and titanium, for example. In some embodiments, reinforcing structure 23 may also be formed from filaments, fibers, or yarns that reinforce aperture 22. In further embodiments reinforcing structure may be absent from wristband 20. In yet further embodiments where the textile material forming wristband 20 is primarily formed from a polymer material, reinforcing structure 23 may be formed from areas of the textile material that are adjacent to aperture 22 and melted to form a semi-rigid structure extending around aperture 22. Based upon the above discussion, therefore, aperture 22 and reinforcing structure 23 may exhibit a variety of configurations within the scope of the present invention.

Aperture 22 is spaced inward from edges of the textile material forming a majority of wristband 20. In this configuration, the textile material forming wristband 20 extends entirely and continuously around aperture 22 to effectively define a hole through wristband 20. In some embodiments, however, aperture 22 may be an indentation in an edge of wristband 20 that receives electronic device 30.

Figure 5:
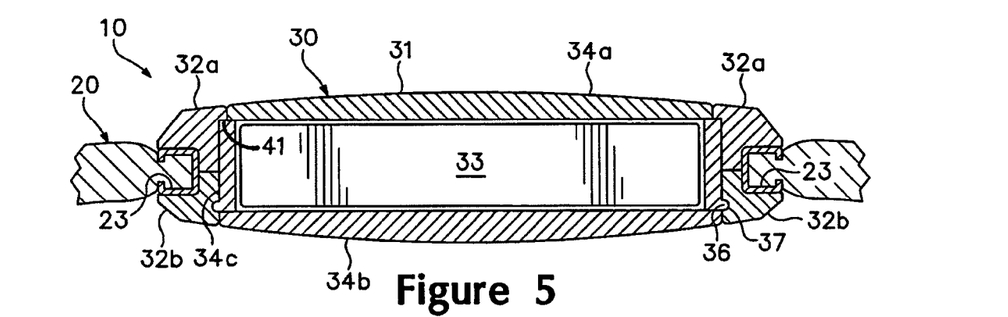
FIG. 5 is a first cross-sectional view of the first article of apparel, as defined along section line 5-5 in FIG. 4.
Figure 6:
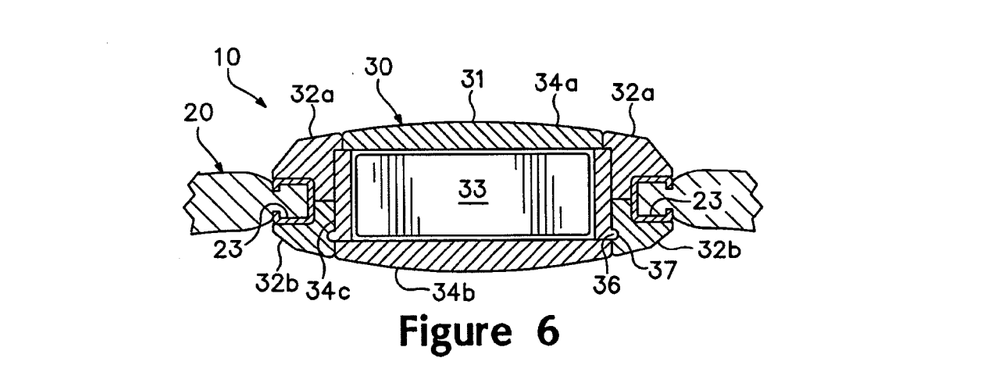
FIG. 6 is a second cross-sectional view of the first article of apparel, as defined along section line 6-6 in FIG. 4.
Figure 7:
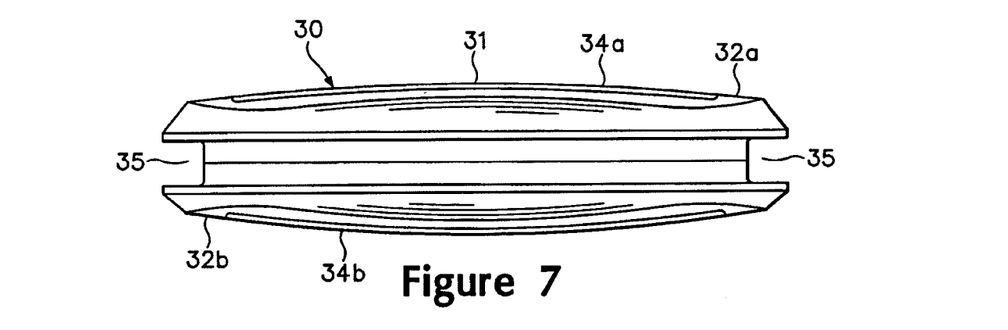
FIG. 7 is a side elevational view of an electronic device associated with first article of apparel.

Electronic device 30 performs the functions of a timing device that tracks and displays time, records split or lap times, or provides chronographic data. The primary components of electronic device 30 are a case 31, a pair of securing elements 32a and 32b, and circuitry 33. Case 31 has a generally box-shaped structure with an upper surface 34a, a lower surface 34b, and a sidewall surface 34c. Securing element 32a extends around sidewall surface 34c and is located adjacent to upper surface 34a. Similarly, securing element 32b extends around sidewall surface 34c and is located adjacent to lower surface 34b. When positioned in the manner discussed above, a gap 35 is formed between securing elements 32a and 32b, as depicted in FIGS. 5-7. Gap 35 effectively forms a peripheral indentation extending at least partially around an exterior of electronic device 30.

Case 31 provides a protective covering for circuitry 33 and may be sealed to protect circuitry 33 from moisture in the form of perspiration or water. An upper portion of case 31 (i.e., upper surface 34a) is transparent so that the individual may view a display that is associated with circuitry 33. A pair of buttons or other activatable devices (not depicted) may also extend through case 31 in order to permit the individual to activate or switch between various functions associated with electronic device 30. Circuitry 33 may include the display (e.g., a liquid crystal display, light emitting diode display, an analog-style display), a microprocessor, and a battery, for example, and effectively forms the portion of electronic device 30 that tracks and displays time, records split or lap times, or provides chronographic data.

Sidewall surface 34c has a generally rectangular configuration with dimensions that substantially correspond with the interior dimensions of aperture 22 and reinforcing structure 23. Case 31 may, therefore, fit within aperture 22 such that reinforcing structure 23 extends around sidewall surface 34c and is positioned adjacent to sidewall surface 34c. In order to secure case 31 within aperture 22, securing elements 32a and 32b are respectively located adjacent upper surface 34a and lower surface 34b and on opposite sides of reinforcing structure 23. That is, electronic device 30 is positioned such that aperture 22 and reinforcing structure 23 are positioned within gap 35, as depicted in FIGS. 5 and 6. Securing elements 32a and 32b extend around case 31 and function, therefore, to secure case 31 within aperture 22.

Securing elements 32a and 32b have the structure of rectangular rings that fit around case 31. In order to securely-position securing elements 32a and 32b around case 31, various protrusions or other structures may be formed on case 31. That is, various structures may be utilized to ensure that securing elements 32a and 32b do not inadvertently slip off of case 31 when electronic device 30 is secured to wristband 20.

When the individual desires to remove electronic device 30 from wristband 20, however, securing elements 32a and 32b may be removed from case 31, and case 31 may be removed from aperture 22. Accordingly, electronic device 30 may be partially disassembled (i.e., securing elements 32a and 32b may be removed or separated from case 31) to separate electronic device 30 from wristband 20.

Figure 1:
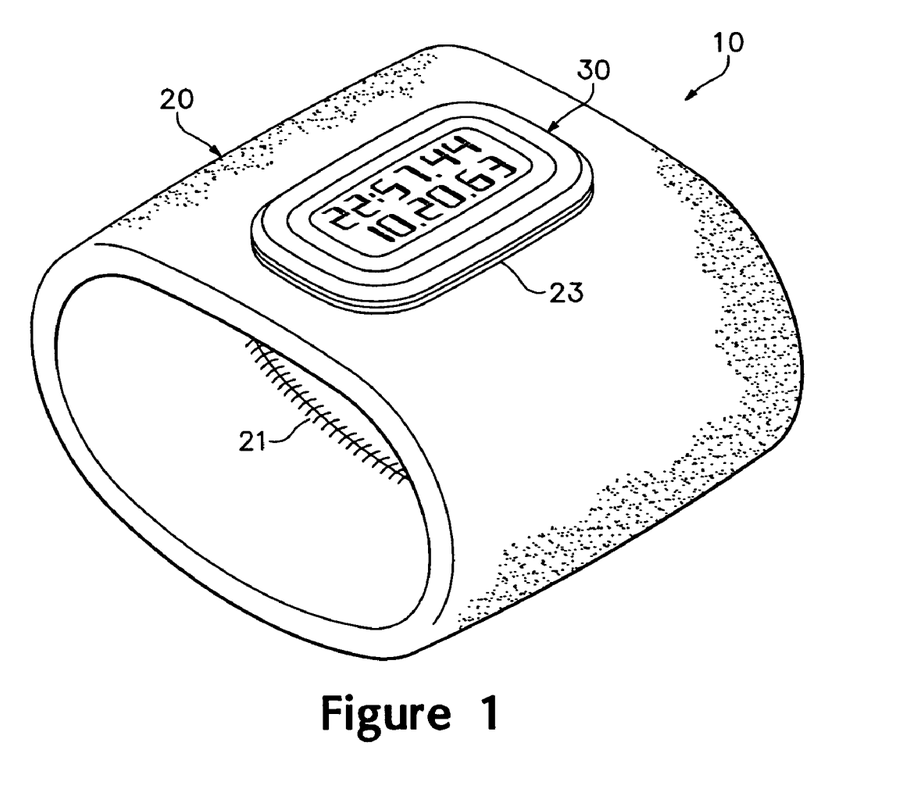
FIG. 1 is a perspective view of a first article of apparel in accordance with the present invention.
Figure 2:
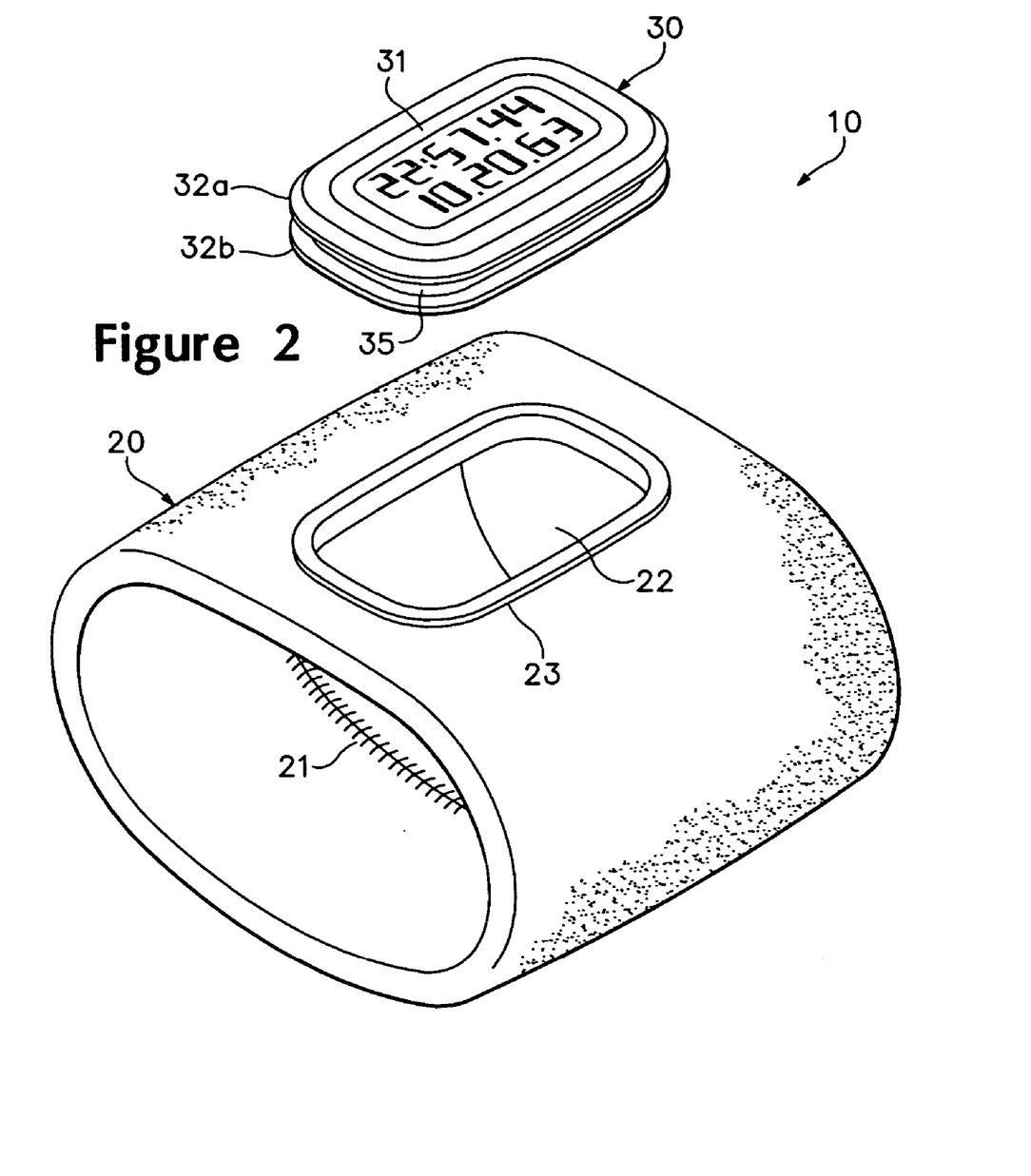
FIG. 2 is a first exploded perspective view of the first article of apparel.
Figure 3:
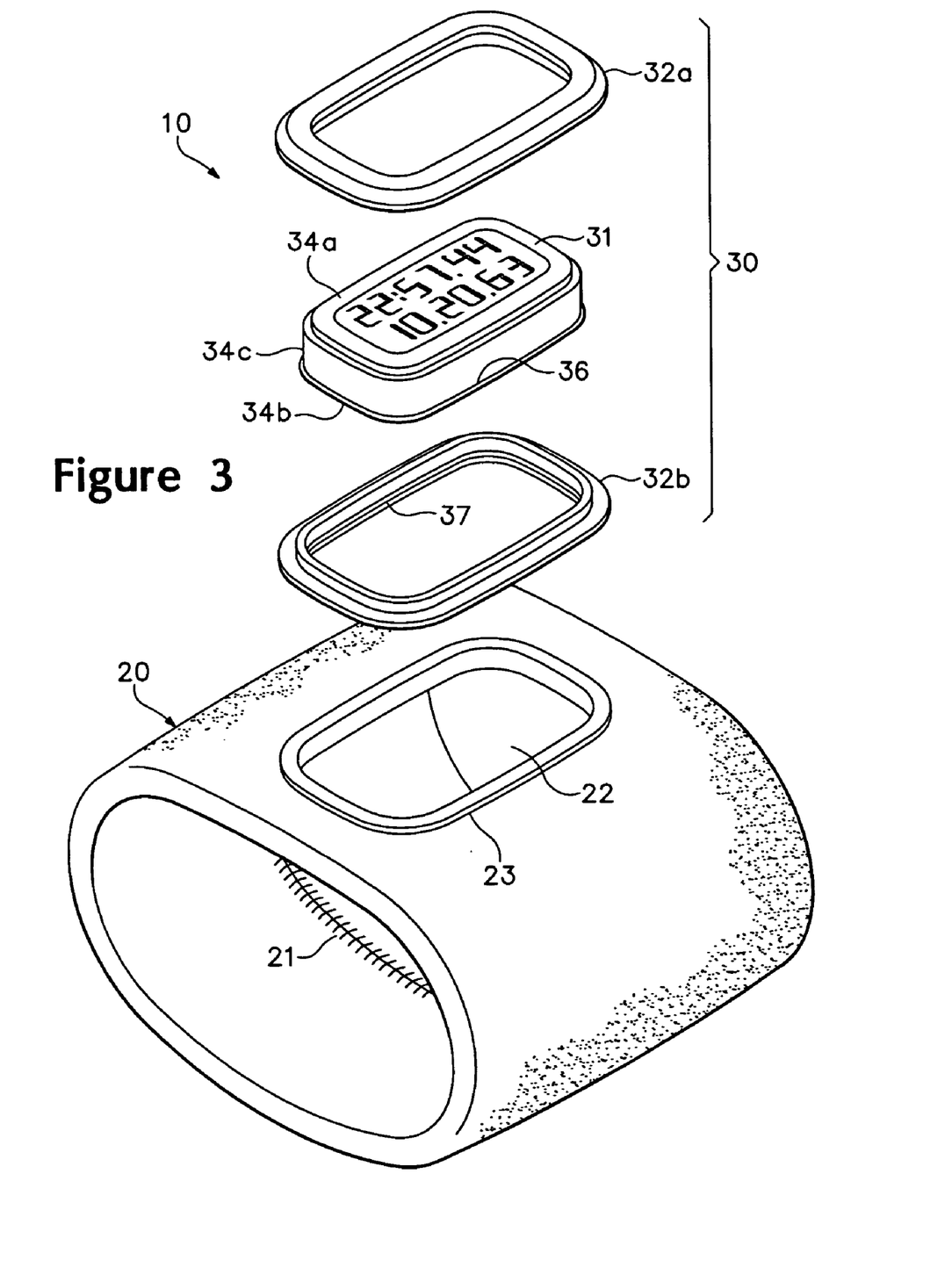
FIG. 3 is a second exploded perspective view of the first article of apparel.
Figure 4:
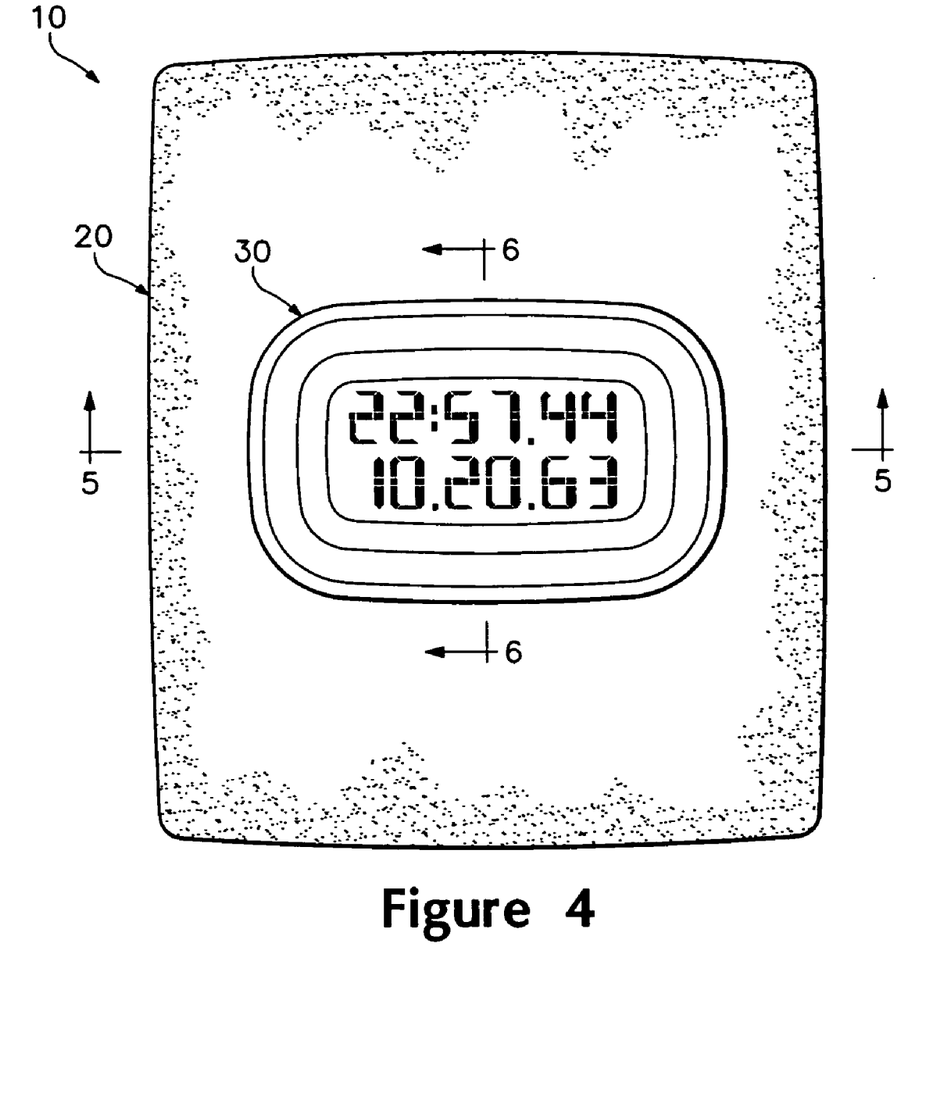
FIG. 4 is a top plan view of the first article of apparel.

As illustrated in FIG. 3, the upper securing element has a lip 41 that extends over at least a portion of a top surface of the electronic device.

Electronic device 30 is positionable within aperture 22 and may be secured to the material element forming wristband 20 by locating reinforcing structure 23 within the peripheral indentation formed by gap 35. In addition, electronic device 30 may be separated from the material element forming wristband 20 by disconnecting or otherwise removing reinforcing structure 23 from the peripheral indentation formed by gap 35. This may be accomplished, for example, by removing one of securing elements 32a and 32b from around case 31 and removing case 31 from aperture 22. In further embodiments, reinforcing structure 23 or the edge of aperture 22 may stretch such that wristband 20 may be removed from gap 35, thereby separating wristband 20 and electronic device 30.

Electronic device 30 may incorporate a locking structure in order to secure case 31 to securing elements 32a and 32b. Referring to FIGS. 3, 5, and 6, a locking protrusion 36 and a corresponding locking indentation 37 are respectively formed in case 31 and securing element 32b. When securing element 32b extends around case 31, locking protrusion 36 fits into locking indentation 37 to secure these elements together. Although locking protrusion 36 and locking indentation 37 are depicted as being associated with case 31 and securing element 32b, another protrusion and indentation may be utilized for securing element 32a. In addition, locking protrusion 36 and locking indentation 37 may only extend partially around case 31 and securing element 32a in further embodiments of the invention. Other forms of locking structure may also be utilized in place of a protrusion and indentation.

Gap 35 forms a peripheral indentation that extends around electronic device 30 and receives reinforcing structure 23. As depicted in the figures, gap 35 is formed solely by securing elements 32a and 32b. That is, case 31 or portions of sidewall 34 do not form gap 35. Furthermore, securing elements 32a and 32b are two separate elements that join electronic device 30 to wristband 20. In some embodiments of the invention, however, one of securing elements 32a and 32b may be formed of unitary (i.e., one-piece) construction with case 31 such that the peripheral indentation is cooperatively formed by the other one of securing elements 32a and 32b and case 31. Although gap 35 is formed solely by securing elements 32a and 32b, the peripheral indentation may be partially formed case 31 in some embodiments.

Aperture 22, electronic device 30, and various other components of apparel 10 are discussed as having a rectangular configuration. In further embodiments of the invention, aperture 22, electronic device 30, and the various other components of apparel 10 may have any suitable corresponding shapes that facilitates securing electronic device 30 to wristband 20 and separating electronic device 30 from wristband 20. For example, aperture 22 may have a circular, elliptical, triangular, square, or hexagonal shape, and case 31 may have a corresponding shape.

Securing elements 32a and 32b are removed from case 31 by sliding securing elements 32a and 32b relative to sidewall 34c. That is, at least one of securing elements 32a and 32b slide in a direction perpendicular to upper surface 34a and lower surface 34b in order to remove electronic device 30 from wristband 20. Furthermore, securing elements 32a and 32b slide in an opposite direction to place securing elements 32a and 32b around case 31 and secure electronic device 30 to wristband 20. This action of sliding securing elements 32a and 32b permits electronic device 30 to exhibit any of the shapes discussed above, particularly the non-circular shapes. If, for example, it was necessary to rotate securing element 32b (due to threading or other rotational securing mechanisms) in order to remove securing element 32b from case 31, then the non-circular shape of case 31 and securing element 32b would prevent this action. Accordingly, when threading or other rotational securing mechanisms are utilized, it may be necessary to form electronic device 30 with a generally circular shape. As discussed above, however, securing elements 32a and 32b slide relative to sidewall 34c, which permits electronic device 30 to have a variety of non-circular shapes.

Although electronic device 30 is discussed above and depicted in the figures as performing the function of a timing device, electronic device 30 may be any of a plurality of suitable electronic devices. For example, electronic device 30 may be a heart rate monitor, a pedometer, a global positioning system (GPS) unit, altimeter, compass, thermometer, calculator, or communication device. In addition, electronic device 30 may perform the functions of two or more of the exemplar electronic devices discussed above. More particularly, electronic device 30 may be a combination of a timing device and GPS unit. Accordingly, the functions of electronic device 30 may vary significantly within the scope of the present invention.

Figure 8:
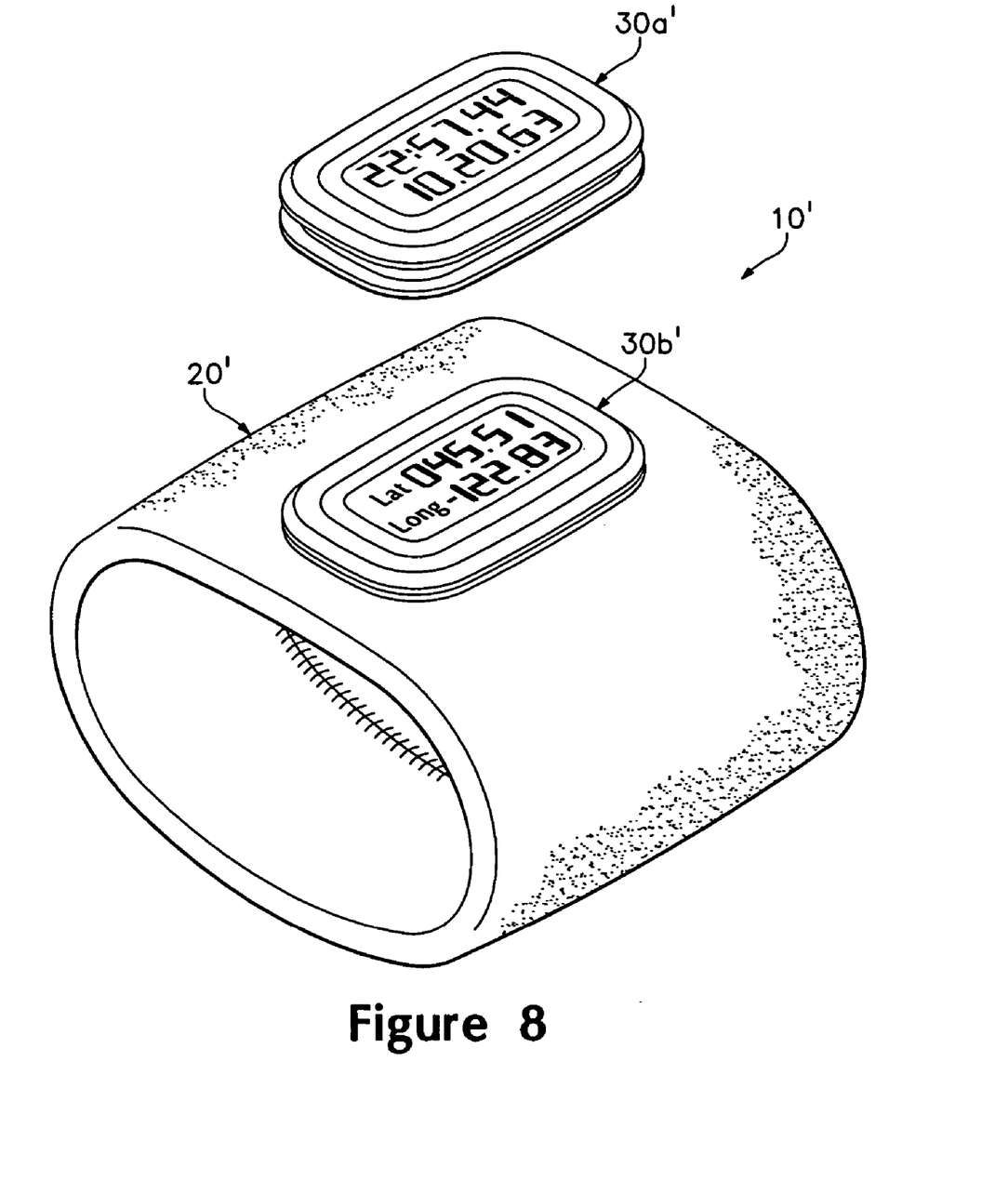
FIG. 8 is a perspective view of a second article of apparel in accordance with the present invention.

With reference to FIG. 8, an article of apparel 10' is depicted as having a wristband 20' and a pair of electronic devices 30a' and 30b'. Wristband 20' exhibits a configuration that is substantially identical to wristband 20. Accordingly, wristband 20' is formed from a textile material and also defines an aperture with a reinforcing structure (not depicted). Whereas electronic device 30a' performs the function of a timing device and is substantially identical to electronic device 30, electronic device 30b' performs the function of a GPS unit. During athletic activities where a timing device would be most beneficial, apparel 10' may be configured such that electronic device 30a' is received by the aperture in wristband 20'. During athletic activities where a GPS unit would be most beneficial, apparel 10' may be configured such that electronic device 30b' is received by the aperture in wristband 20', as depicted in FIG. 8. Accordingly, apparel 10' has a configuration where one of electronic devices 30a' and 30b' may be utilized in combination with wristband 20', and electronic devices 30a' and 30b' may be freely interchanged by the individual. In further embodiments, electronic devices 30a' and 30b' may perform other functions, or additional electronic devices may be available for use by the individual. When wristband 20' is subjected to a washing process, however, both of electronic devices 30a' and 30b' may be removed from the aperture in wristband 20'.

Figure 9:
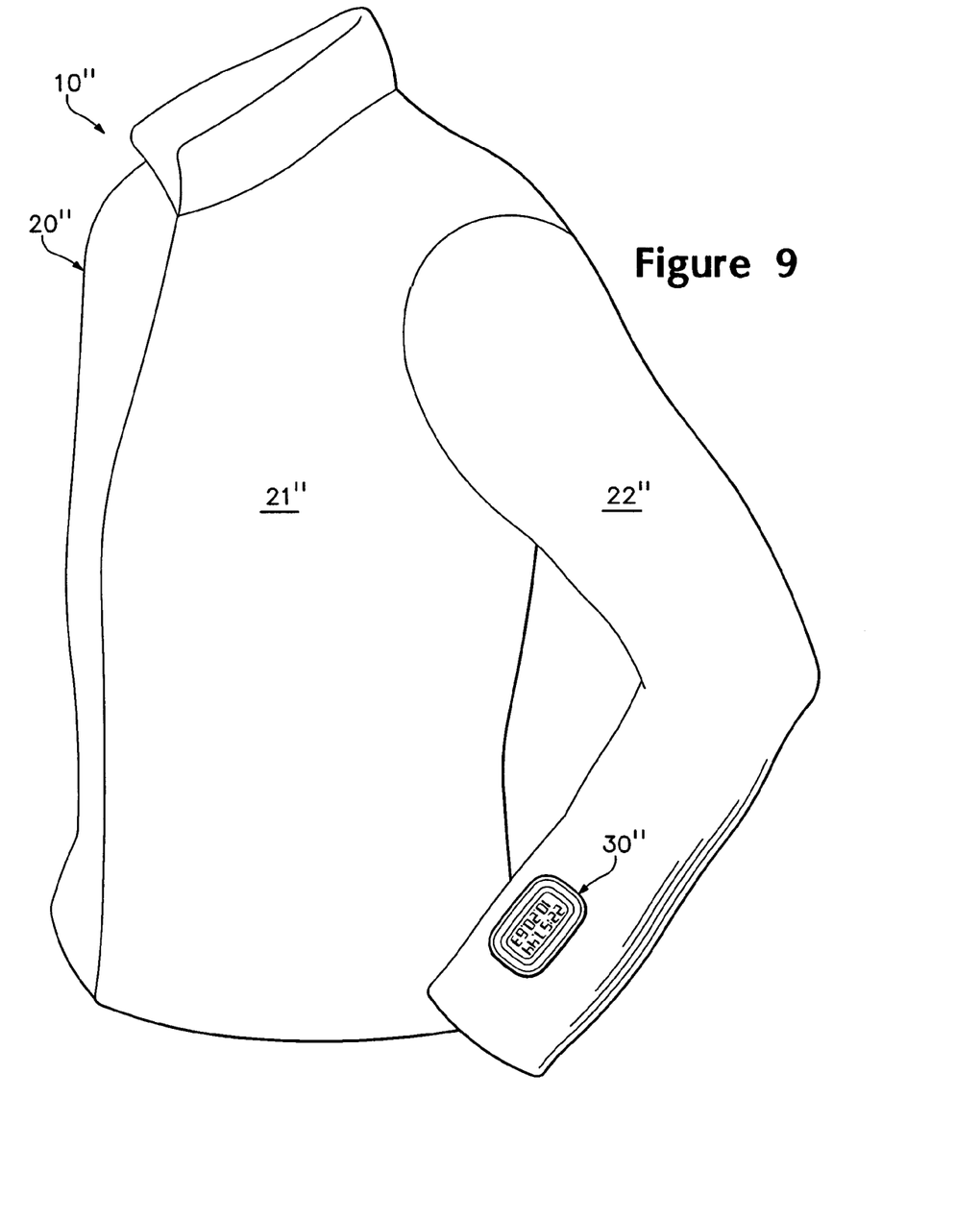
FIG. 9 is a perspective view of a third article of apparel in accordance with the present invention.

In addition to wristbands, various other types of apparel may incorporate the features of apparel 20 and 20', including gloves, shirts, pants, hats, socks, footwear, underwear, and coats, for example. With reference to FIG. 9, an article of apparel 10" is depicted as having a jacket 20" and an electronic device 30". Jacket 20" includes a torso region 21" and a pair of arm regions 22". One of arm regions 22" defines an aperture that receives electronic device 30". As with apparel 10 and 10', electronic device 30" is removable from the aperture for purposes of washing jacket 22" or interchanging electronic device 30" with another electronic device.

Although electronic device 30" is depicted as being located in a wrist area of one of arm regions 22", electronic device 30" may be positioned anywhere relative to jacket 20" in other embodiments of the invention.

Based upon the above discussion, any article of apparel may include an electronic device, such as electronic device 30. The apparel is at least partially formed from a material element that defines an aperture, and the electronic device is locatable within the aperture and removably-securable to the material element. The electronic device may be a timing device, such as a watch, or a global positioning system unit, for example. The apparel may be a wristband formed from a textile material or any of a variety of other types of apparel.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An article of apparel comprising:
   a textile element that defines an aperture having a non-circular shape;
   a reinforcing structure positionable within the aperture and attachable to the textile element;
   an electronic device positionable within the aperture and securable to at least one of the reinforcing structure and the textile element, the electronic device also being removable from the aperture, and the electronic device having a non-circular shape; and
   a first securing member that is directly releasably securable to a second securing member, the first securing member and the second securing member configured to releasably engage the reinforcing structure and to releasably engage the electronic device to thereby releasably secure at least a portion of the electronic device to the textile element within the aperture, wherein at least one of the first securing member and the second securing member has a lip that extends over at least a portion of a top surface of the electronic device.

2. The article of apparel recited in claim 1, wherein the textile element is a wristband.

3. The article of apparel recited in claim 2, wherein the textile element is at least partially formed from a terry knit material.

4. The article of apparel recited in claim 1, wherein the electronic device is a timing device.

5. The article of apparel recited in claim 1, wherein the electronic element is a global positioning system unit.

6. The article of apparel recited in claim 1, wherein the electronic device includes a case and circuitry.

7. The article of apparel recited in claim 6, wherein the circuitry is positioned within the case, and the first securing member and the second securing member extend around the case.

8. The article of apparel recited in claim 7, wherein the first securing member and the second securing member are separated to define a peripheral gap extending at least partially around an exterior of the electronic device.

9. The article of apparel recited in claim 8, wherein the electronic device is positionable within the aperture and is secured to the textile element by locating an edge of the aperture within the peripheral gap, and the electronic device is separable from the textile element by disconnecting the edge and the peripheral gap.

10. The article of apparel recited in claim 1, where the first securing member and the second securing member completely surround a side surface of the electronic device.

11. An article of apparel comprising:
    a wristband at least partially formed from a textile material, the wristband defining an aperture with a non-circular shape;
    a reinforcing structure that is positioned within the aperture and attachable to the wristband;
    an electronic device that is locatable within the aperture and removably-securable to the wristband, the electronic device having the non-circular shape; and
    a pair of securing members configured to directly releasably engage the reinforcing structure and to directly releasably engage the electronic device to thereby releasable secure the electronic device to the wristband, wherein at least one of the securing members has a lip that extends over at least a portion of a top surface of the electronic device.

12. The article of apparel recited in claim 11, wherein the wristband is at least partially formed from a terry knit material.

13. The article of apparel recited in claim 11, wherein the electronic device is a timing device.

14. The article of apparel recited in claim 11, wherein the electronic element is a global positioning system unit.

15. The article of apparel recited in claim 11, wherein the electronic device includes a case and circuitry.

16. The article of apparel recited in claim 15, wherein the circuitry is positioned within the case, and the pair of securing members extend around the case.

17. The article of apparel recited in claim 16, wherein the pair of securing members are separated to define a peripheral gap extending at least partially around an exterior of the electronic device.

18. The article of apparel recited in claim 11, wherein the electronic device is positionable within the aperture and may be secured to the wristband by locating the reinforcing structure within the peripheral gap, and the electronic device may be separated from the wristband by disconnecting the reinforcing structure and the peripheral gap.

19. The article of apparel recited in claim 11, where the pair of securing members completely surround a side surface of the electronic device.

20. An article of apparel, comprising:
    a textile element that defines an aperture;
    a reinforcing structure that is located within the aperture and secured to the textile element to form a peripheral edge of the aperture, wherein the reinforcing structure is formed from a material that is more rigid than the textile element; and
    an electronic device having a peripheral gap extending at least partially around an exterior of the electronic device, the electronic device having a case that contains circuitry, and the electronic device having a two-piece securing structure that defines the peripheral gap, the two-piece securing structure directly releasably engaging the case and directly releasably engaging the reinforcing structure, the two-piece securing structure further having a lip that extends over at least a portion of a top surface of the electronic device,
    wherein the electronic device is positionable within the aperture and is secured to the textile gap by locating the reinforcing structure within the peripheral indentation, and the electronic device is separated from the textile element by disconnecting the reinforcing structure and the peripheral gap.

21. The article of apparel recited in claim 20, wherein the textile element is a wristband.

22. The article of apparel recited in claim 21, wherein the textile element is at least partially formed from a terry knit material.

23. The article of apparel recited in claim 20, wherein the electronic device is a timing device.

24. The article of apparel recited in claim 20, wherein the electronic device is a global positioning system unit.

25. The article of apparel recited in claim 20, wherein the two-piece securing structure extends around a sidewall surface of the case.

26. The article of apparel recited in claim 25, wherein the two-piece securing structure slides relative to the sidewall surface in order to remove the two-piece securing structure from the case.

27. The article of apparel recited in claim 20, wherein the textile element is one of a shirt and a jacket.

28. An article of apparel comprising:
a material element that defines an aperture with a peripheral edge, the aperture being spaced inward from edges of the material element;
a reinforcing structure that is secured to the peripheral edge and is formed from a material that is more rigid than the material element; and
an electronic device having a case, circuitry, and a pair of securing elements, wherein at least one of the securing elements has a lip that extends over at least a portion of a top surface of the electronic device, the circuitry being positioned within the case, and the securing elements extending around the case directly releasably engaging the case, and directly releasably engaging the reinforcing structure, the securing elements defining a peripheral gap extending at least partially around an exterior of the electronic device,
wherein the electronic device is positionable within the aperture and is secured to the material element by locating the reinforcing structure within the peripheral gap, and the electronic device is separated from the material element by disconnecting the reinforcing structure and the peripheral gap.

29. The article of apparel recited in claim 28, wherein the material element is a wristband.

30. The article of apparel recited in claim 29, wherein the material element is at least partially formed from a terry knit material.

31. The article of apparel recited in claim 28, wherein the electronic device is a timing device.

32. The article of apparel recited in claim 28, wherein the electronic element is a global positioning system unit.

33. The article of apparel recited in claim 28, wherein the textile element is one of a shirt and a jacket.

34. The article of apparel recited in claim 28, wherein the case and at least one of the securing elements define a protrusion and a corresponding indentation, the protrusion fitting within the indentation to secure the at least one of the securing elements to the case.

35. A method of assembling an article of apparel, the method comprising steps of:
providing an aperture in a wristband;
positioning a reinforcing structure within the aperture;
positioning an electronic element within the aperture and adjacent to the reinforcing structure; and
positioning securing elements around the electronic element and on opposite sides of the wristband and the electronic element, the securing elements configured to directly releasably engage the reinforcing structure and to directly releasably engage the electronic element to thereby releasably secure the electronic element to the wristband within a channel at least partially defined by the side walls of the securing elements, wherein at least one of the securing elements has a lip that extends at least partially over a top surface of the electronic element.

36. The method recited in claim 35, further including a step of removing the electronic element from the aperture.

37. The method recited in claim 36, further including a step of subjecting the wristband to a washing process in the absence of the electronic element.

38. The method recited in claim 36, further including a step of interchanging the electronic element with another electronic element.

* * * * *